3,328,796
RADAR RANGE TRACKING APPARATUS
Robert J. Follen and Baard H. Thue, Minneapolis, Minn., assignors to Honeywell Inc., Minneapolis, Minn., a corporation of Delaware
Filed Sept. 17, 1965, Ser. No. 488,185
5 Claims. (Cl. 343—7.3)

This invention relates to distance measuring or echo ranging apparatus and particularly concerns a performance monitor and an accuracy vernier for use with a pulse tracking radar altimeter.

The accuracy requirements for radar altimeters are becoming more stringent. To meet these requirements the present invention provides an altimeter with a performance monitor and an accuracy vernier. The invention is illustrated in connection with a radar altimeter of the type disclosed in the following U.S. Patent: Leyde et al. No. 3,242,488, filed Feb. 5, 1962, and assigned to Honeywell Inc. The altimeter disclosed in the above patent employs leading edge tracking and is referred to as an example of the general type of radar in which the invention can be employed. Accordingly it is an object of the present invention to provide a performance monitor and accuracy vernier for a pulse tracking radar altimeter.

This object is met by providing a radar altimeter with means for comparing a D-C output signal therefrom, indicative of altitude, and the average value of an A-C internal signal indicative of the time between transmitted and reflected pulses and providing an alarm signal when the difference between the signals compared reaches a predetermined level. This signal difference is also used to electronically adjust the altimeter internally so as to keep the difference within prescribed limits. The internal adjustment is made to a ramp generator which provides the time base for the system. Thus, an accuracy vernier control is provided which in effect keeps the output waveform of the ramp generator constant.

Figure 1:
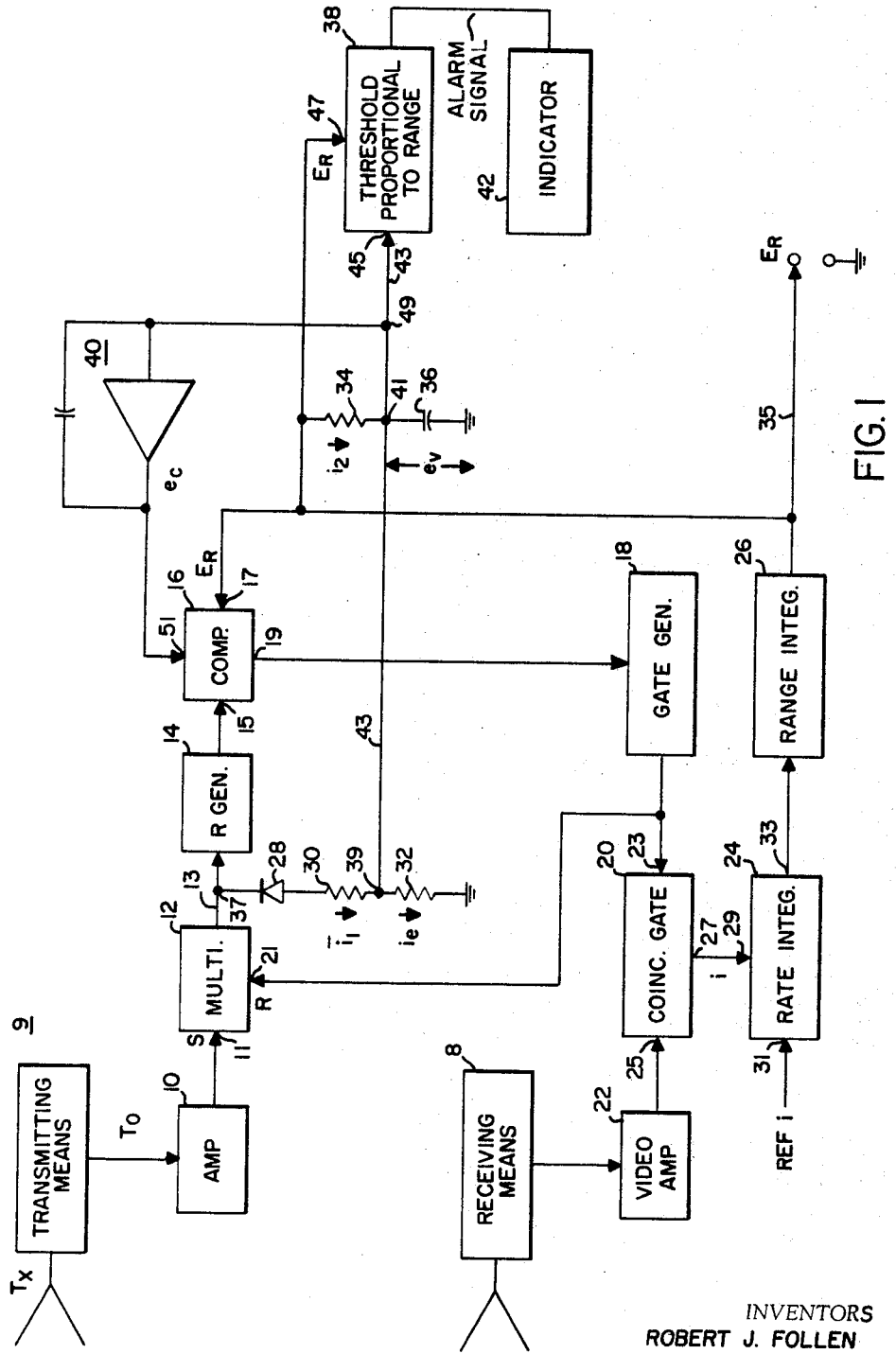
Figure 2:
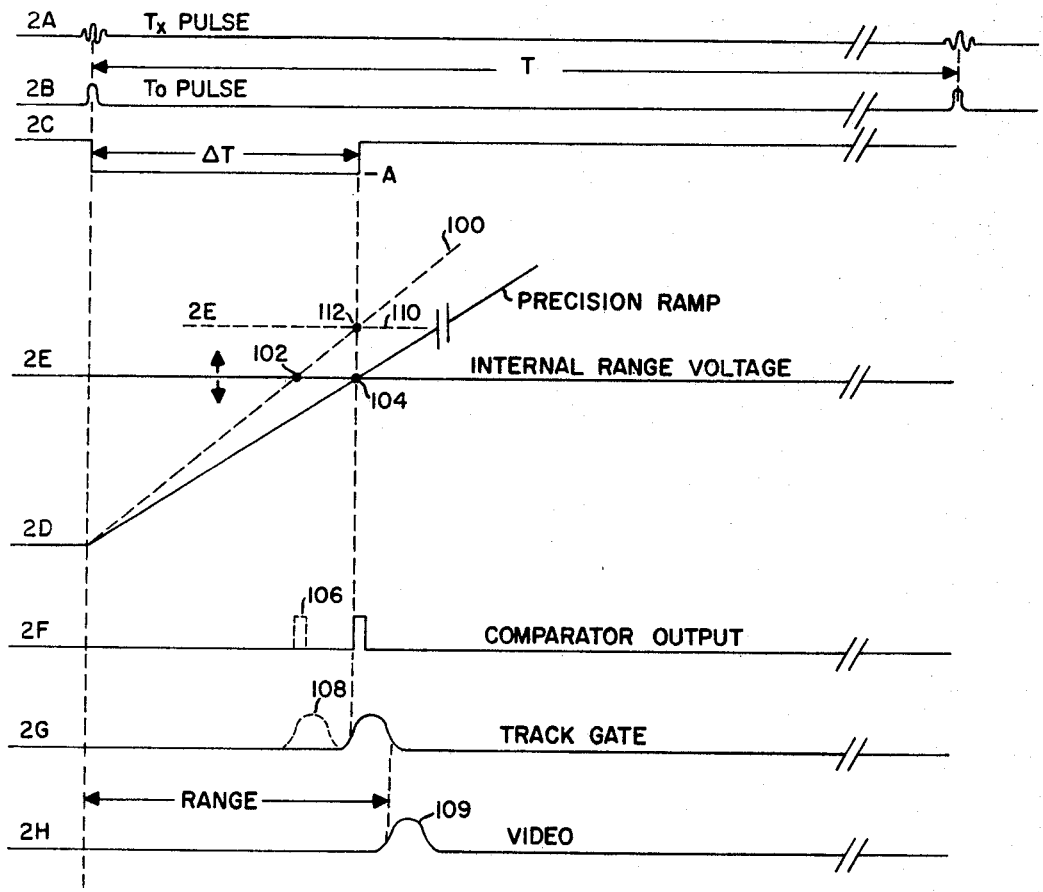

This and other objects and advantages will become apparent after reading the specification in conjunction with the drawings, in which:

FIGURE 1 is a simplified schematic illustrating the invention in connection with a leading edge tracking radar in the tracking mode; and FIGURE 2 is a set of wave forms present at various points in the altimeter system.

Specific terminology is used to describe the invetion. This is done merely for clarity, and limitation to the specific terms is not to be inferred. Each specific term includes all technical equivalents.

In the system shown in FIGURE 1 a pulse, designated $T_0$, is delivered to an amplifier 10 from a transmitting means 9. Wave form 2B of FIGURE 2 illustrates the $T_0$ pulse. (Wave forms will be referred to as 2A, 2B, 2C, etc., without further reference to FIGURE 2.) The $T_0$ pulse is derived from a $T_x$, or transmitter main bang pulse. The $T_x$ pulse is depicted by wave form 2A. The $T_0$ pulse provides a time reference for the tracking system. A bistable multivibrator 12, hereinafter called multi 12, is set by the $T_0$ pulse after it has been amplified and sharpened or shaped in amplifier 10. The $T_0$ pulse is delivered to an input means 11, or set ($s$) terminal, of multi 12. Wave form 2C illustrates the output of multi 12 at the time it is set by the $T_0$ pulse. The output level of multi 12 in the set condition or state is designated as —A. The output of multi 12, present on output line 13, is used to trigger a linear ramp generator 14. Wave form 2D depicts the output of generator 14, a precision ramp voltage beginning when multi 12 is set. The output ramp of generator 14 is delivered to the first input means 15 of a comparator 16. The second input means 17 of comparator 16 is connected to an internal range voltage designated $E_R$, a D-C signal which is the ultimate output of the system and directly proportional or corresponding to altitude or range. The internal range voltage $E_R$ is used to actuate an indicating device (not shown). It has been assumed that the system is in the tracking mode, the voltage $E_R$ being initially generated by the system during the search mode. For an explanation of the search mode refer to the aforementioned Leyde et al. patent. The tracking system is designed to automatically respond to, or track, and indicate, altitude within a predetermined altitude range and rate. If changes occur outside the predetermined rate, tracking is lost, and the system automatically switches to a search mode until the reflecting surface or target is again located by the tracker.

When the voltage ramp produced by generator 14, present at input means 15 of comparator 16, reaches a level equal to the internal range voltage (wave form 2E), present at input means 17 of comparator 16, an output pulse is generated at an output means 19 of comparator 16. Wave form 2F depicts the output pulse of comparator 16. The pulse from comparator 16 triggers a gate generator 18 which produces a pulse, called a track gate, illustrated by wave form 2G. The track gate is fed back to an input means 21, or reset (R) terminal, of multi 12, resetting multi 12, and is also delivered to the first input means 23 of a coincidence gate 20. A video signal (echo) received by receiving means 8, and, amplified by amplifier 22, is delivered to the second input means 25 of gate 20. The video signal is represented by wave form 2H. The output of gate 20, at output means 27, is a current which is proportional to the degree of overlap of the track gate and the video signal. This current, fed to input means 29 of rate integrator 24, is combined in integrator 24 with a reference current. The reference current is fed to input means 31 of integrator 24. The system is designed such that when the track gate and the video signal overlap by a predetermined degree (e.g. when the trailing edge of the track gate crosses the leading edge of the video signal at about the 6$d$B point) the currents at the input means 29 and 31 respectively of integrator 24 cancel exactly and there is no effective input to integrator 24. The output of rate integrator 24, present at output means 33 is delivered to a range integrator 26, the output of which, present on an output line 35, is the internal range voltage $E_R$. Integrators 24 and 26, in the tracking mode, are only responsive to changes in altitude. If the degree of overlap of the track gate and video signal does not change there is no change in the output of integrator 24 and thus no change in the output of integrator 26, since the output of integrator 24 provides the input to integrator 26.

The tracking operation is briefly explained as follows: Assume that the altitude or range increases; then the video signal or echo will occur later in time and the degree of overlap of the echo and the track gate in gate 20 will decrease, causing a corresponding decrease in the output current of gate 20. The reference current is no longer fully cancelled by the current from gate 20 and the output of integrator 24 increases. The increasing output of integrator 24 provides an input signal to integrator 26 which results in the output of integrator 26, $E_R$, increasing. As $E_R$ increases the time at which the linear ramp of generator 14 coincides with $E_R$ in comparator 16 is delayed. As the time of coincidence is delayed the output pulse of comparator 16 is also delayed, gate 18 is triggered later, the track gate output of gate 18 is delayed, until the additional delay of the track gate corresponds to the additional delay of the video signal (caused by an increase in altitude), and system balance is restored.

With this brief explanation of system operation the improvements to the system comprising the invention will now be described. The set time of multi 12, designated $\Delta T$ (see wave form 2C), is a direct representation or measure of the true distance to the reflecting surface or object from the transmitter, filtered by the dynamics of the tracking loop, due to the constant propagation velocity of electromagnetic waves. In waveform 2C the output amplitude of multi 12 during its set time is designated by a constant $-A$.

The output of multi 12 in addition to being connected to ramp generator 14, is connected to a series circuit comprising diode 28 and resistors 30 and 32, at a junction 37 on line 13. When multi 12 is in the set condition current can flow in a path from a common junction 39 between resistors 30 and 32 (assuming junction 39 is positive with respect to the output of multi 12) through resistor 30 and diode 28 (in the forward direction) to junction 37 on output line 13 of multi 12. Resistor 32 is connected between junction 39 and ground.

A series circuit comprising a resistor 34 and a capacitor 36, joined at a common junction 41, are connected across the internal range voltage $E_R$. A line 43 joins junctions 39 and 41 and is connected to the input means 45 of a level switch 38. Switch 38 also has an input means 47 across which $E_R$ is impressed. Switch 38 may be operated to have a fixed threshold level or may be designed to have a threshold level which varies with $E_R$ (altitude). It has been assumed that switch 38 has a variable threshold level. An $E_R$ input switch 38 is not necessary if fixed level operation is satisfactory.

The average current going through resistor 30 toward junction 39 is designated $\bar{i}_1$. The current flowing through resistor 32 from junction 39 is designated $i_e$. The current flowing through resistor 34 toward junction 41 is designated $i_2$, and the input signal voltage to switch 38, present across capacitor 36, is designated $e_v$.

The area of the output of multi 12 is $A\Delta T$, where A is a constant and $\Delta T$ is directly proportional to the correct indicated range regardless of the effect of the slope of the output waveform 2D on the indicated range voltage $E_R$. This statement is explained as follows: Assume that the system is tracking and is in a steady state when the slope of waveform 2D suddenly increases due, perhaps, to a change in value of one of the electronic components in ramp generator 14. This change in slope is shown in waveform 2D in FIGURE 2 by dashed line 100. The change in slope is exaggerated for purposes of illustration. Ramp 2D represented by dashed line 100 now intercepts waveform 2E at a point 102 rather than at a point 104. Waveform 2E, of course, refers to the internal range voltage $E_R$. Point 102 occurs earlier in relative time than does point 104 and therefore the output of comparator 16 also occurs earlier in time. The earlier occurring output of comparator 16 is shown as dashed pulse 106 in waveform 2F in FIGURE 2. The track gate 2G, that is the output of gate generator 18, also occurs earlier in time because it depends upon the output of comparator 16. The earlier occurring track gate output is shown as a dashed pulse 108 in waveform 2G. Since track gate 108 no longer overlaps a portion of the video signal labeled 109 in waveform 2H of FIGURE 2, the signal current out of coincidence gate 20 decreases and the combined input to rate integrator 24 is unbalanced. Under steady state conditions, the input current to input means 29 of integrator 24 exactly balances out the reference current at the input means 51 of integrator 24. However, if the current at input terminal 29 decreases, a net signal is presented to the rate integrator and it begins integrating. Due to this integration, an output signal occurs at output means 33 which is re-integrated by range integrator 26. The output of range integrator 26, which is $E_R$, increases. The increase in $E_R$ continues until the system is again balanced. At this time, the range voltage $E_R$ has increased and is represented by dashed line 110 in FIGURE 2. Dashed line 110 in FIGURE 2 is intercepted by dashed line 100 at a point 112. Point 112 occurs at the same relative time as point 104. The position of the video signal 109 has not changed, but the voltage representing the range, $E_R$, has increased. In this way then it can be said that $\Delta T$ is directly proportional to the correct range regardless of the affect of the slope of the output waveform of the ramp generator. Note that the wave forms in FIGURE 2 are exaggerated for purposes of illustration and that actually the range, indicated between the wave forms 2G and 2H, represents substantially the same time duration as $\Delta T$ does in wave form 2C. This range (R) and $E_R$ are related by the constant $K_1$ as follows: $R = k_1 E_R$. The expressions $k_1 E_R$ and $A\Delta T$ are essentially equivalent if it is assumed that the system is operating as intended, e.g., that the slope of the ramp generator has not changed from its correct designed-for value. This of course is merely saying that if the system is operating properly $E_R$ is directly proportional to $\Delta T$, which is the range in terms of time. Assuming $e_v = 0$, the average current, $\bar{i}_1$, through resistor 30 is:

$$\bar{i}_1 = -\frac{A}{R_{30}} \frac{\Delta T}{T}$$

where $R_{30}$ represents the resistance of resistor 30. The potential across resistor 30 is $-A$ during the time $\Delta T$ when multi 12 is set. During every period T multi 12 is set for some fraction thereof designated $\Delta T$. Therefore, to get the average current, the factor $-A$ divided by $R_{30}$ must be multiplied by an averaging factor $\Delta T$ divided by T in order to arrive at an average current value. T is the time period between $T_0$ pulses. The negative sign merely indicates that this current flows opposite to the reference direction indicated by the arrow. The average current $i_2$ through resistor 34 is: $i_2 = E_R / R_{34}$. That is, the current through resistor 34 is equal to the voltage across the resistor divided by the resistance of the resistor. Since $e_v$, the average voltage across capacitor 36 has been assumed to be zero during a no error condition, the voltage across resistor 34 is $E_R$, the voltage on line 35 and also the voltage at the upper terminal of resistor 34. It follows that if resistors 30 and 34 are suitably scaled, $\bar{i}_1 + i_2 = 0$ if the altimeter readout $E_R$ is absolutely correct. Deviations from this relation in the first approximation, are proportional to the altimeter indicated error as applied to $E_R$.

Errors in $E_R$ are indicated by the relationship $\bar{i}_1 + i_2 = i_e$ which is the summation of currents at junctions 39 and 41 and since $e_v$ which is the voltage across capacitor 36 is also impressed across resistor 32, $e_v = i_e R_{32}$. For small errors $e_v = k_2 e$ where $k_2$ is a constant of proportionality and $e$ is the altimeter error. In other words, for small errors, the voltage $e_v$ is proportional to the error. Capacitor 36 and resistor 32 serve to average the sum of the currents flowing into junctions 39 and 41.

The voltage $e_v$ triggers level switch 38, the output of which provides an alarm signal to an indicator 42 indicating that the average altimeter indication error exceeds the equivalent switching level. By providing switch 38 with an input indicative of $E_R$ (at input means 47) the equivalent switching level can be made to be proportional to range or altitude so that a warning indication is provided any time the average altimeter error exceeds a predetermined percentage of the indicated range. In this manner the altimeter performance can be monitored.

The invention also provides a vernier accuracy control. The voltage signal developed across capacitor 36, $e_v$ is also fed, from a junction 49 on line 43, to the input of an integrator 40, The output of which, designated $e_c$, is fed to a third input means 51 of comparator 16. In this manner the error signal, $e_v$, is integrated to provide a signal, $e_c$, which is used to adjust the comparison point or the bias of comparator 16. The effect of $e_c$ on the comparison point of comparator 16 is to change $E_R$ in a sense or direction that will null $e_v$. When $e_v = 0$ the indicated range $E_R$ is absolutely correct regardless of any nonlinearities in the ramp produced by generator 14 or zero drift in the analog tracker circuits, e.g., integrators 24 and 26.

The advantages of the invention are numerous. The system described will, under all altimeter modes of operation, provide an alarm signal if the altimeter accuracy falls below a predetermined percentage of the indicated range. In addition, with the vernier control, high altimeter accuracy is attained. Furthermore, excess zero drift is easily controlled and the circuits can operate at relatively low voltage levels. Operation of low voltage levels is important if the altimeter is to be micro-miniaturized. The design of ramp generator 14 is simplified and the operation made less critical because nonlinearities can, at least to a large degree, be compensated for by the action of the vernier control.

The form of the invention shown and described is merely one embodiment. Various changes can be made without departing from the scope of the invention defined by the claims.

Having described our invention, we claim:

1. In a radar altimeter system wherein a tracking gate effectively occurs at a variable time $\Delta T$, after the transmission of a pulse from a transmitter in the system in correspondence with a video signal representing a reflected echo pulse, and a D–C voltage $E_R$, corresponding to the variable time, indicative of the altitude, is produced, the combination comprising:
   means for developing an electric current which is a function of the variable time $\Delta T$;
   means for developing an electric current which is a function of the D-C voltage $E_R$;
   means for summing the aforementioned electric currents, the currents being of opposite sense, and the currents being scaled according to the requirement that the average of the sum of the currents must be equal to a predetermined value when there is no discrepancy between the variable time $\Delta T$ and the corresponding D-C voltage $E_R$; and
   switching means responsive to said summing means when the current sum is not equal to the predetermined value.

2. In an echo ranging system wherein a gate with a variable time delay overlaps and tracks an echo pulse, the degree of overlap providing a signal to integrating means which generates a D-C signal indicating the range corresponding to the echo pulse, the improvement comprising in combination:
   means for developing a first signal which is a function of the variable time delay;
   means for developing a second signal which is a function of the range indicative signal;
   means for developing a third signal which corresponds to the average value of the algebraic sum of said first and second developed signals; and
   switching means, triggered when said third signal reaches a predetermined level, said switching means providing a monitoring signal.

3. The apparatus of claim 2 wherein there is provided additional means for integrating the third signal, the integrated quantity providing a signal used to effectively change the time delay of the tracking gate, and hence the degree of overlap, until the third signal falls below the predetermined level.

4. In an echo ranging system wherein a tracking gate effectively occurs at a variable time after the transmission of a pulse from a transmitter in the system in correspondence with a video signal representing a reflected echo pulse, and a D-C signal normally corresponding to the variable time and indicative of the range is produced, the combination comprising:
   means for developing a first signal which is a function of the variable time;
   means for developing a second signal which is a function of the D-C signal;
   means for summing the first and second signals, the signals being of opposite sense and scaled according to the requirement that the average of the algebraic sum of the signals must be equal to a predetermined value when there is no discrepancy between the variable time and the corresponding D-C signal; and
   switching means responsive to said summing means when the signal sum is not equal to the predetermined value, said switching means including means for providing a warning signal.

5. In an echo ranging system wherein a gate having a variable time delay overlaps and tracks an echo pulse, a signal being provided to a double integrator, depending on the degree of overlap, which generates a signal indicating the range corresponding to the echo pulse, the improvement comprising in combination:
   means for developing a first signal which is a function of the variable time delay;
   means for developing a second signal which is a function of the range indicative signal;
   means for developing a third signal which is the average of the algebraic sum of said first and second signals; and
   warning switching means, triggered when said third signal reaches a predetermined magnitude.

References Cited

UNITED STATES PATENTS 3,040,312   6/1962   Lair _____ 343—7.3

RODNEY D. BENNETT, *Primary Examiner.*

CHESTER L. JUSTUS, *Examiner.*

T. H. TUBBESING, *Assistant Examiner.*